United States Patent
Moroto et al.

(10) Patent No.: US 8,333,007 B2
(45) Date of Patent: Dec. 18, 2012

(54) METHOD FOR MANUFACTURING MOTOR DEVICE FOR A FUEL PUMP

(75) Inventors: Kiyonori Moroto, Kariya (JP); Akira Kuroyanagi, Chiryu (JP); Tadashi Hazama, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/457,530

(22) Filed: Jun. 15, 2009

(65) Prior Publication Data

US 2009/0260220 A1      Oct. 22, 2009

Related U.S. Application Data

(62) Division of application No. 11/798,380, filed on May 14, 2007, now Pat. No. 7,859,165.

(30) Foreign Application Priority Data

May 30, 2006    (JP) ................................. 2006-149553
Jun. 15, 2006   (JP) ................................. 2006-165853

(51) Int. Cl.
H02K 15/12     (2006.01)
H02K 13/00     (2006.01)

(52) U.S. Cl. .......................... 29/598; 264/272.2; 310/43

(58) Field of Classification Search .................... 29/598; 310/237, 43, 261.01, 261.1, 264, 234, 224, 310/87; 264/272.2
See application file for complete search history.

(56) References Cited

U.S. PATENT DOCUMENTS

| | | | |
|---|---|---|---|
| 2,831,991 A * | 4/1958 | Perkins ............................ | 310/43 |
| 5,530,311 A * | 6/1996 | Ziegler ........................... | 310/237 |
| 6,946,758 B2 * | 9/2005 | Du et al. ......................... | 310/43 |
| 7,003,867 B2 | 2/2006 | Yamamoto et al. | |
| 7,213,579 B2 | 5/2007 | Ikeya | |
| 7,265,466 B2 | 9/2007 | Yamashita et al. | |
| 7,309,206 B2 | 12/2007 | Oi | |
| 2003/0202893 A1 | 10/2003 | Moroto et al. | |
| 2004/0124737 A1 | 7/2004 | Yamamoto et al. | |
| 2005/0013709 A1 | 1/2005 | Ikeya | |

(Continued)

FOREIGN PATENT DOCUMENTS

JP      63-272994      11/1988

(Continued)

OTHER PUBLICATIONS

Official Action dated Jan. 6, 2010, issued in U.S. Appl. No. 11/798,380, of Moroto et al, filed May 14, 2007.

(Continued)

*Primary Examiner* — Livius R Cazan
(74) *Attorney, Agent, or Firm* — Nixon & Vanderhye PC

(57) ABSTRACT

A fuel pump includes a pump portion for pumping fuel. The fuel pump further includes a magnet having magnetic poles circumferentially alternate with each other. The fuel pump further includes an armature on a radially inside of the magnet. The armature includes a rotor core provided with a coil formed of a wire. The armature is rotatable for driving the pump portion. A commutator, which is in a substantially disc shape, is provided to an axial end of the armature for rectifying electricity supplying to the coil. The rotor core has an axial end having an outer circumferential periphery defining a commutator-side collar portion extending toward the commutator. The coil is formed by winding the wire between an outer circumferential periphery of the commutator and the commutator-side collar portion.

9 Claims, 12 Drawing Sheets

U.S. PATENT DOCUMENTS

| | | |
|---|---|---|
| 2005/0151440 A1 | 7/2005 | Yamashita et al. |
| 2006/0261700 A1 | 11/2006 | Du et al. |
| 2007/0104567 A1 | 5/2007 | Narisako et al. |

FOREIGN PATENT DOCUMENTS

| | | |
|---|---|---|
| JP | 63-194575 | 12/1988 |
| JP | 64-055050 | 3/1989 |
| JP | 64-54744 | 4/1989 |
| JP | 5-30691 | 2/1993 |
| JP | 5-62179 | 8/1993 |
| JP | 5-284679 | 10/1993 |
| JP | 6-86523 | 3/1994 |
| JP | 6-122133 | 5/1994 |
| JP | 07-163103 | 6/1995 |
| JP | 2776304 | 5/1998 |
| JP | 10-257712 | 9/1998 |
| JP | 10-271786 | 10/1998 |
| JP | 11-299133 | 10/1999 |
| JP | 2000-197332 | 7/2000 |
| JP | 2001-352731 | 12/2001 |
| JP | 2002-262483 | 9/2002 |
| JP | 2005-094924 | 4/2005 |
| JP | 2005-185078 | 7/2005 |

OTHER PUBLICATIONS

Japanese Office Action dated Dec. 17, 2009, issued in corresponding Japanese Application No. 2006-149553, with English translation.

Chinese Office Action dated May 22 2009, issued in corresponding Chinese Application No. 2007101064227, with English translation.

Official Action dated Jul. 23, 2009, issued in parent U.S. Appl. No. 11/798,380, of Moroto et al, filed May 14, 2007.

Office Action dated Jul. 9, 2010 issued in corresponding U.S. Appl. No. 11/798,380.

Japanese Office Action dated Apr. 21, 2011, issued in corresponding Japanese Application No. 2006-165853 with English Translation.

Japanese Appeal Decision dated Sep. 13, 2011, issued in counterpart Japanese Application No. 2006-149553 with English translation.

\* cited by examiner

METHOD FOR MANUFACTURING MOTOR DEVICE FOR A FUEL PUMP

CROSS-REFERENCE TO RELATED APPLICATION

This application is a Divisional of application Ser. No. 11/798,380, filed May 14, 2007, now U.S. Pat. No. 7,859,165, the entire contents of which are hereby incorporated by reference into this application. This application is also based on and claims priority from Japanese Patent Application No. 2006-149553, filed on May 30, 2006, and Japanese Patent Application No. 2006-165853 filed on Jun. 15, 2006, the contents of which are hereby incorporated by reference into this application.

FIELD OF THE INVENTION

The present invention relates to a fuel pump having an armature for driving a pump portion. The present invention further relates to a motor device for the fuel pump. The present invention further relates to a method for manufacturing the fuel pump and the motor device.

BACKGROUND OF THE INVENTION

In general, a fuel pump such as an in-tank type fuel pump, which is accommodated in a fuel tank, is required to being downsized in view of a mounting space for the fuel pump. According to JP-B2-2776304, a fuel pump includes a commutator, which is in a flat disc shape, brushes, and an armature. Brushes are provided on the opposite side of the commutator with respect to the armature. In this structure, the outer diameter of the fuel pump can be reduced.

According to JP-A-2001-352731, a fuel pump includes an armature including a rotor core. The rotor core has the outer circumferential peripheries in one axial end, and the outer circumferential peripheries are bent. In this structure, magnetic flux formed between permanent magnets, which are provided on the radially outer side of the armature, and the rotor core can be enhanced without axially extending the armature. That is, torque produced using the motor portion can be enhanced in the case where the axial length of the motor portion of the fuel pump is the same. Alternatively, the axial length of the motor portion can be reduced, so that the axial length of the fuel pump can be downsized, in the case where torque required to the motor portion is the same.

Here, JP-A-2001-352731 discloses a commutator in a cylindrical shape. This commutator is downsized, so that brushes can be provided to the radially outer side of the commutator. Collar portions are provided to a rotor core by bending the outer circumferential peripheries of one axial end of the rotor core. The outer circumferential periphery of the cylindrical commutator and the collar portions define a space therebetween. When the commutator is in a cylindrical shape, this space can be readily secured, and wires can be wound to form coils in this space.

A fuel pump can be downsized by combining the disc-shape commutator in JP-B2-2776304 and the rotor core, which has the bent outer circumferential peripheries in the axial end, in JP-A-2001-352731. However, in this combined structure, it is hard to secure the space, in which wires are wound to form coils, between the commutator and the rotor core. The distance between the commutator and the rotor core may be axially extended for securing a space, in which wires are wound to form coils, between the disc-shaped commutator and the rotor core having the bent outer circumferential periphery. However, when the distance between the commutator and the rotor core is axially extended, the fuel pump is axially elongated.

An armature includes a rotor core and coils, which is formed by winding wires on the rotor core. In general, a resin material is charged in an armature and a commutator for reducing resistance against rotation of a motor portion in a fuel pump. Furthermore, electrically connecting portions between coils, windings of the coils, and terminals can be protected from corrosion by charging the resin material in a fuel pump. In JP-A-H06-122133, an armature and a commutator are provided in molding dies, and a resin material is charged into the molding dies.

The armature includes a rotation shaft, which serves as a rotation axis, assembled by, for example, being press-inserted into a rotor core of the armature. In this structure, when the rotor core is axially applied with molding pressure of the resin material charged into the molding dies, the rotor core may be displaced axially relative to the rotation shaft. For example, the rotation shaft is press-inserted into the rotor core to secure therebetween high connecting strength such as 980 N (100 kgf). That is, in this case, it is necessary to apply force of about 980 N for displacing the rotor core relative to the rotation shaft. However, even in this case, when molding pressure is applied from axially one side to the rotor core being 25 mm in diameter, allowable molding pressure, by which the rotor core is not displaced axially relative to the rotation shaft, is about 2 MPa. In general, a resin injection molding apparatus is capable of applying molding pressure greater than ten-times of the allowable molding pressure. Accordingly, the rotor core may be displaced relative to the rotation shaft when being applied with the molding pressure in a resin injection molding apparatus.

SUMMARY OF THE INVENTION

The present invention addresses the above disadvantage. According to one aspect of the present invention, a fuel pump includes a pump portion for pumping fuel. The fuel pump further includes a magnet having a plurality of magnetic poles circumferentially alternate with each other. The fuel pump further includes an armature provided on a radially inside of the magnet, the armature including a rotor core provided with a coil formed of a wire, the armature being rotatable for driving the pump portion. The fuel pump further includes a commutator being in a substantially disc shape provided to an axial end of the armature for rectifying electricity supplying to the coil. The rotor core has an axial end having an outer circumferential periphery defining a commutator-side collar portion on a side of the commutator, the commutator-side collar portion extending toward the commutator. The coil is formed by winding the wire between an outer circumferential periphery of the commutator and the commutator-side collar portion.

According to another aspect of the present invention, a fuel pump includes a pump portion including a rotor member being rotatable for pumping fuel, the pump portion further including a case member for rotatably accommodating the pump portion. The fuel pump further includes a permanent magnet having a plurality of magnetic poles circumferentially alternate with each other. The fuel pump further includes an armature provided on a radially inside of the magnet, the armature including a rotor core provided with a coil formed of a wire, the armature being rotatable for driving the rotor member. The rotor core has an axial end having an outer circumferential periphery defining a case-side collar portion in the vicinity of the case member, the case-side collar portion extending toward the case member. The coil is formed by winding the wire between the case-side collar portion and the case member.

According to another aspect of the present invention, a fuel pump includes a permanent magnet having a plurality of magnetic poles circumferentially alternate with each other. The fuel pump further includes an armature rotatably provided on a radially inside of the magnet, the armature including a rotor core provided with a coil formed of a wire. The fuel pump further includes a rotation axis assembled to the rotor core. The fuel pump further includes a commutator rotatable together with the armature, the commutator being adapted to rectifying electricity supplied to the coil. The fuel pump further includes a pump portion for pumping fuel by being driven using the armature. The fuel pump further includes a resin member molded with the armature and the commutator. The rotor core and the resin member axially define therebetween at least one boundary. The at least one boundary defines a step around which the resin member is radially recessed inwardly relative to the rotor core.

According to another aspect of the present invention, a motor device for driving a pump device of a fuel pump by being magnetized using a permanent magnet circumferentially surrounding the motor device, the motor device including an armature including a rotor core provided with a coil. The device further includes a rotation axis assembled to the rotor core. The device further includes a commutator fixed to the armature for rectifying electricity supplied to the coil. The device further includes a resin member molded with the armature and the commutator. The rotor core and the resin member axially define therebetween at least one boundary. The at least one boundary defines a step around which the resin member is radially recessed inwardly relative to the rotor core.

According to another aspect of the present invention, a method for manufacturing a fuel pump, the fuel pump including a permanent magnet having a plurality of magnetic poles circumferentially alternate with each other. The fuel pump further includes an armature rotatably provided on a radially inside of the magnet, the armature including a rotor core provided with a coil formed of a wire. The fuel pump further includes a rotation axis assembled to the rotor core. The fuel pump further includes a commutator rotatable together with the armature, the commutator adapted to rectifying electricity supplied to the coil. The fuel pump further includes a pump portion for pumping fuel by being driven by the armature. The fuel pump further includes a resin member molded with the armature and the commutator. The method includes assembling of the rotation axis to the rotor core. The method further includes assembling of the armature to the commutator to construct a structural assembly. The method further includes locating of the structural assembly in molding dies. The method further includes charging of a resin material from a side of a first axial end of the rotor core into the molding dies to mold the resin member in a condition where a second axial end of the rotor core is in contact with the molding dies.

According to another aspect of the present invention, a method for manufacturing a fuel pump, the method including assembling a rotation axis to a rotor core, which is provided with a coil, to construct an armature. The method further includes assembling of the armature to the commutator to construct a structural assembly. The method further includes locating of the structural assembly in molding dies. The method further includes charging of a resin material from a side of a first axial end of the rotor core into the molding dies to mold a resin member with the armature and the commutator in a condition where a second axial end of the rotor core is in contact with the molding dies. The method further includes assembling of the resin member, which is molded together with the armature and the commutator, to a magnet having a plurality of magnetic poles circumferentially alternate with each other, such that the armature is rotatable on a radially inside of the magnet. The method further includes assembling of the resin member, which is molded together with the armature and the commutator, to a pump portion.

According to another aspect of the present invention, a method for manufacturing an motor device for driving a pump portion of a fuel pump by being magnetized using a permanent magnet circumferentially surrounding the motor device, the method including assembling a rotation axis to a rotor core, which is provided with a coil, to construct an armature. The method further includes assembling of the armature to the commutator to construct a structural assembly. The method further includes locating of the structural assembly in molding dies. The method further includes charging of a resin material from a side of a first axial end of the rotor core into the molding dies to mold a resin member with the armature and the commutator in a condition where a second axial end of the rotor core is in contact with the molding dies.

BRIEF DESCRIPTION OF THE DRAWINGS

The above and other objects, features and advantages of the present invention will become more apparent from the following detailed description made with reference to the accompanying drawings. In the drawings.

Figure 1:
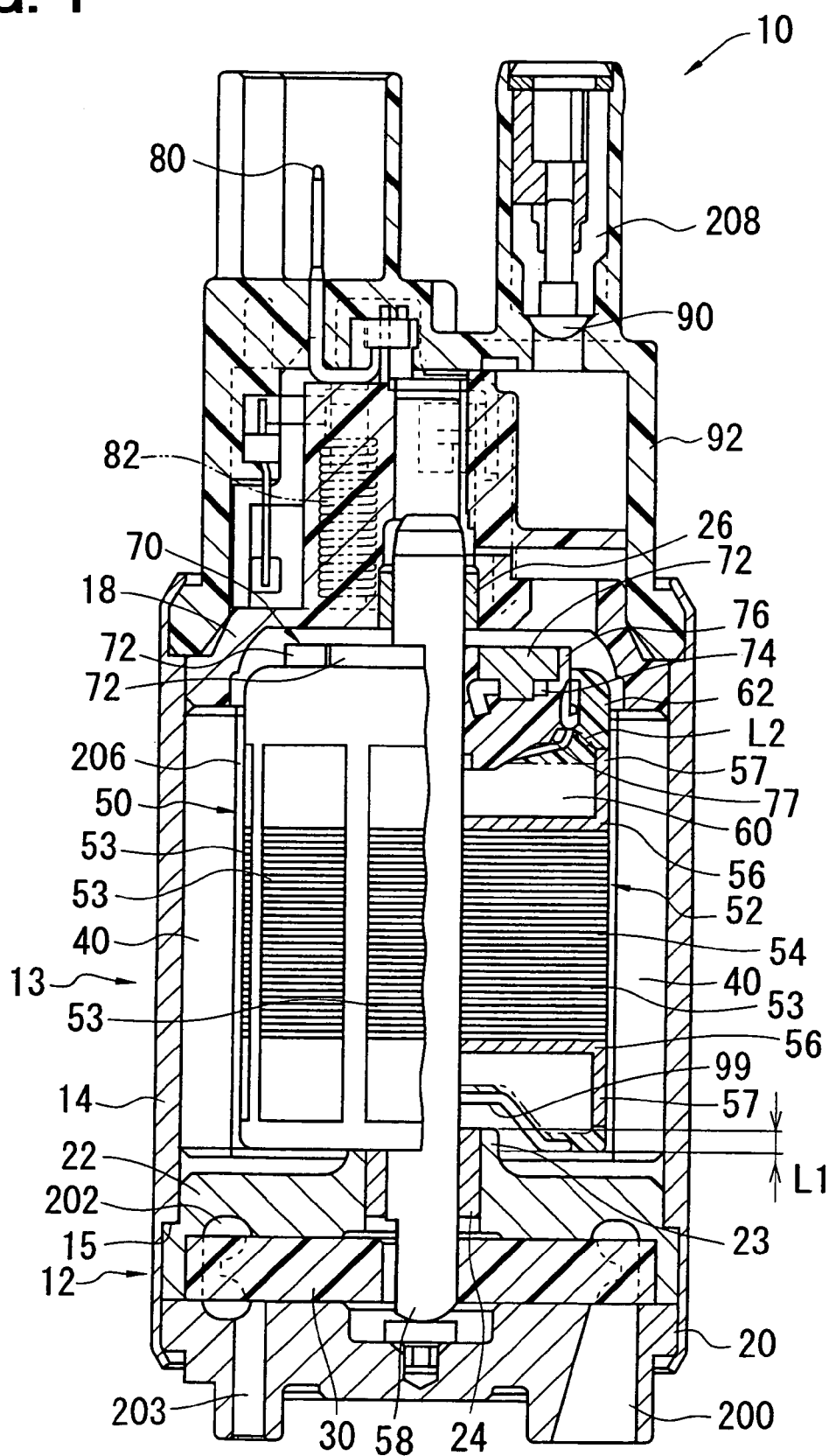
FIG. 1 is a sectional view showing a fuel pump according to a first embodiment.

DETAILED DESCRIPTION OF PREFERRED EMBODIMENTS (First Embodiment)

As shown in FIGS. 1 to 3B, a fuel pump 10 is an in-tank type pump that is provided in an unillustrated fuel tank of a vehicle such as a two-wheel vehicle or a four-wheel vehicle. The fuel pump 10 draws fuel from the fuel tank, and supplies the fuel to an internal combustion engine.

The fuel pump 10 includes a pump portion 12 and a motor portion 13. The motor portion 13 drives the pump portion 12. A housing 14 accommodates both the pump portion 12 and the motor portion 13. The housing 14 has both axial ends respectively crimped and fixed to an end cover 92 and a pump case 20. The housing 14 is crimped to the pump case 20, such that a pump case 22 is interposed between the pump case 20 and a step 15 of the housing 14.

The pump portion 12 is a turbine pump that includes pump cases 20, 22, and an impeller 30. The pump cases 20, 22 serve as case members rotatably accommodating the impeller 30 as a rotor member. The pump case 20 has an inlet port 200 through which fuel is drawn into pump passages 202. The pump cases 20, 22 and the impeller 30 define the pump passages 202 in C-shapes thereamong. The impeller 30 in a substantially disc-shape has the outer circumferential periphery, to which multiple vane grooves are provided along a rotative direction. The armature 50 rotates, so that the impeller 30 rotates together with a shaft 58. Fuel flows out of a foreside vane groove, and flows into a backside vane groove with respect to the rotative direction with rotation of the impeller 30, so that the fuel forms a swirl flow through the pump passages 202. Fuel is pressurized through the pump passages 202 by repeating the flowing out of the foreside vane groove and flowing into the backside vane groove. The pump case 20 has a vent hole 203. Vapor contained in fuel flowing through the pump passages 202 is vent to the outside of the fuel pump 10 through the vent hole 203.

Fuel is drawn through the inlet port 200 with rotation of the impeller 30, and is pressurized through the pump passages 202 with rotation of the impeller 30, thereby being press-fed toward the motor portion 13 through an unillustrated outlet port provided to the pump case 22. The fuel press-fed toward the motor portion 13 is supplied toward an engine through a discharge port 208, which is provided to the end cover 92, after passing through a fuel passage 206 defined between permanent magnets 40 and the armature 50. The discharge port 208 accommodates a check valve 90 for restricting counterflow of fuel trough the discharge port 208.

The motor portion 13 is constructed of the permanent magnets 40, the armature 50, a commutator 70, and the like. Each of the permanent magnets 40 is in a substantially arch shape. Two permanent magnets 40 are circumferentially arranged along the inner circumferential periphery of the housing 14. The permanent magnets 40 define magnetic poles in the inner circumferential periphery opposed to the armature 50. The magnetic poles are different from each other with respect to the circumferential direction. The armature 50 is provided to the radially inner side of the permanent magnets 40. The armature 50 is constructed of a rotor core 52 and coils 60. The rotor core 52 is constructed by axially stacking magnetic steel plates. Each of the coils 60 is wound around each of magnetic pole cores 53 of the rotor core 52. In FIG. 1, each of the chain double-dashed lines in each axial end of the armature 50 defines a space in which the coils 60 are provided.

Figure 2:
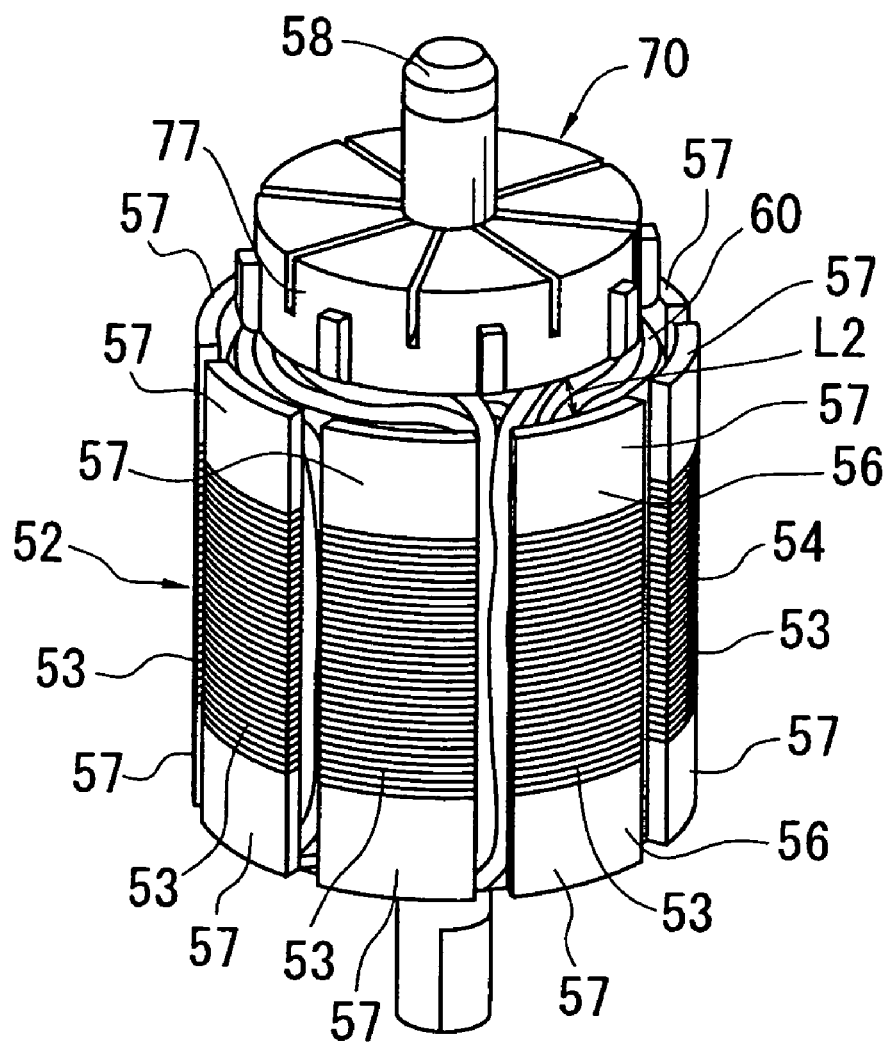
FIG. 2 is a perspective view showing an armature and a commutator of the fuel pump.
Figure 3A:
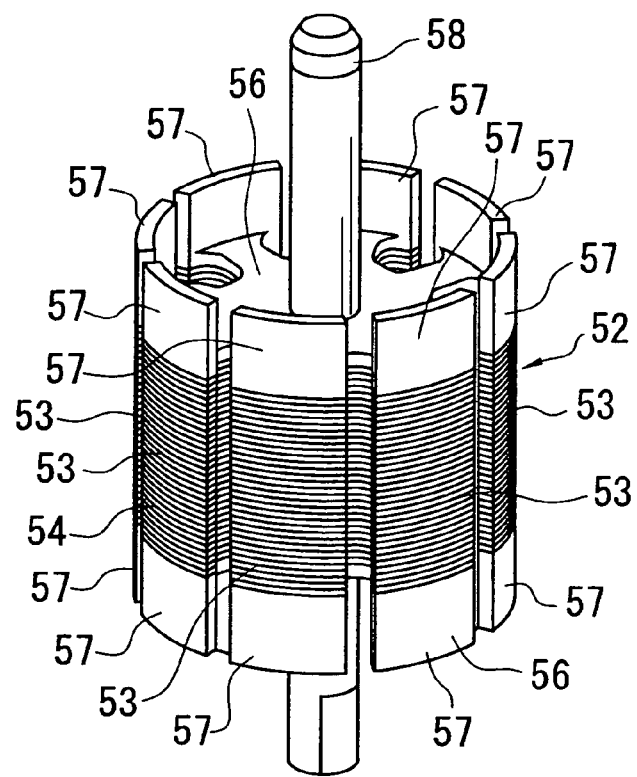
FIG. 3A is a perspective view showing a rotor core before being provided with coils.
Figure 3B:
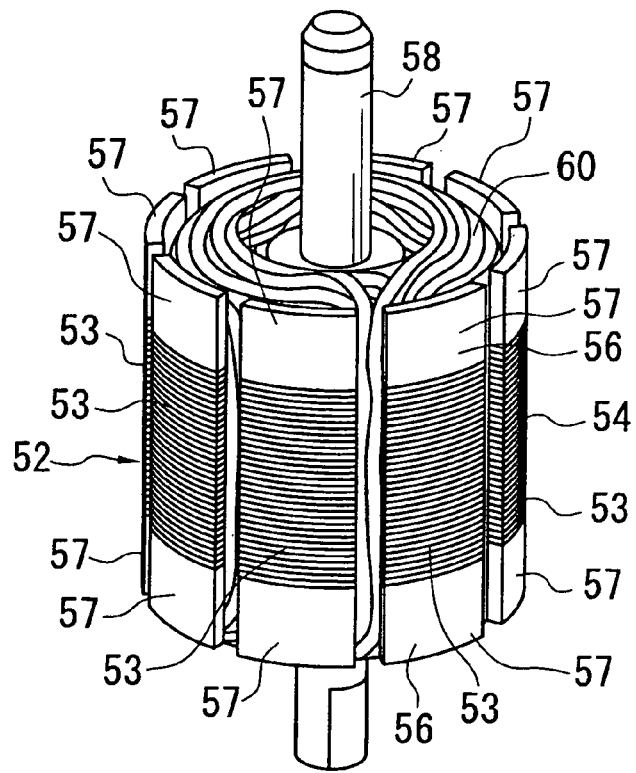
FIG. 3B is a perspective view showing the rotor core after being provided with the coils.

As shown in FIGS. 1 to 3B, each magnetic steel plate 56 is stacked on each axial end of the rotor core 52. The thickness of each magnetic steel plate 56 is greater than the thickness of each of the magnetic steel plates 54, other than the axial ends of the rotor core 52. FIG. 2 depicts the armature 50 before being charged with the electrically insulative resin 62. FIG. 3A depicts the rotor core 52, from which the commutator 70 is omitted, before being provided with the coils 60 and before being charged with the electrically insulative resin 62. FIG. 3B depicts the rotor core 52, from which the commutator 70 is omitted, after being provided with the coils 60 and before being charged with an electrically insulative resin 62. In reality, the coil 60 is constructed by winding windings around the rotor core 52 attached with the commutator 70.

Each of the magnetic steel plates 56 has collar portions 57 correspondingly to the magnetic pole cores 53. One of the magnetic steel plates 56 has the outer circumferential peripheries each being bent by press-forming or the like toward the commutator 70, thereby being shaped to one of the collar portions 57. The other of the magnetic steel plates 56 has the outer circumferential peripheries each being bent by press-forming or the like toward the pump case 22, thereby being shaped to one of the collar portions 57. Each of the collar portions 57 on the commutator 70 serves as a commutator-side collar portion 57. Each of the collar portions 57 on the pump case 22 serves as a case-side collar portion 57.

Referring to FIG. 1, the shaft 58 serves as a rotation axis of the armature 50. The shaft 58 has both axial ends each rotatably supported by corresponding one of the bearings 24, 26. Each of the bearings 24, 26 are supported by corresponding one of the pump case 22 and a bearing holder 18.

Each of the coils 60 is constructed by winding the winding around the rotor core 52, and is fixed by charging the electrically insulative resin 62. The height of each coil 60 radially on the side of the shaft 58 is less than the height radially on the side of the outer circumferential periphery thereof in the vicinity of the pump case 22. The armature 50 has a recession 99 around the shaft 58 in the vicinity of the pump case 22 in a condition where the electrically insulative resin 62 is charged. The pump case 22 has a bearing support (bearing portion) 23 for supporting the bearing 24. The bearing support 23 and the recession 99 radially overlap one another in the range depicted by a length L1 in FIG. 1. In this structure, the bearing support 23 axially thrusts into the armature 50. The height of the coils 60 is less than the height of the collar portions 57 in the vicinity of the commutator 70.

That is, in the above structure, each coil 60 has the outer circumferential periphery including a radially outer portion in the vicinity of the pump case 22. The radially outer portion has an outer height. The coil 60 has a radially inner portion on a side of the shaft 58 of the armature 50 in the vicinity of the pump case 22. The radially inner portion has an inner height. The outer height is greater than the inner height. The armature 50 has the recession 99 around the shaft 58 in the vicinity of the pump case 22. The pump case 22 has the bearing support 23 for rotatably supporting the shaft 58. The bearing support 23 and the recession 99 radially overlap with each other.

The commutator 70 is in a substantially disc shape. The commutator 70 is provided to the axial end of the armature 50 on the opposite side of the impeller 30. The commutator 70 includes multiple segments 72 that are arranged with respect to the rotative direction. The segments 72 are formed of carbon, for example. The segments 72 are electrically connected with the coils 60 via terminals 74. The segments 72 adjacent to each other are electrically insulated from each other via the gap and the electrically insulative resin 76. The commutator 70 has an outer circumferential periphery 77. The outer circumferential periphery 77 other than the axial end surface thereof has a taper surface, which becomes close to the magnetic steel plate 56 on the side of the shaft 58 toward the center thereof. The outer circumferential periphery 77 of the commutator 70 is distant from each of the collar portions 57 of the magnetic steel plate 56 for a distance L2. The distance L2 is greater than the diameter of the winding of each coil 60. The outer circumferential periphery 77 of the commutator 70 is located on the radially inside of the inner circumferential peripheries of the collar portions 57.

The end cover 92 is pres-inserted with pump terminals 80. Driving current is supplied from the pump terminals 80 to the coils 60 of the armature 50 via an unillustrated brushes and the commutator 70. The end surfaces of the segments 72 on the axially opposite side of the armature 50 sequentially slide on the brushes, so that the driving current supplied to the coils 60 is rectified.

The brushes are serially connected with a choke coil 82 for reducing electric noise caused in the sequential sliding between each segment 72 of the commutator 70 and each brush.

In this embodiment, the rotor core 52 of the armature 50 includes the magnetic steel plates 56 in both axial ends thereof. Each of the magnetic steel plates 56 has the outer circumferential peripheries defining the collar portions 57 axially extending toward corresponding one of the commutator 70 and the pump case 22. In this structure, magnetic flux formed between the permanent magnets 40, which are arranged on the radially outer side of the armature 50, and the rotor core 52 can be enhanced. Thus, torque generated using the motor portion 13 can be enhanced by supplying the same driving current, without increasing the axial length of the motor portion 13. Thus, the motor efficiency of the motor portion 13 can be enhanced.

The motor efficiency ηm of the motor portion 13 is defined by ηm=(T×N)/(I×V). A pump efficiency ηp is defined by ηp=(P×Q)/(T×N). Here, the driving current supplied to the motor portion 13 of the fuel pump 10 is I. Voltage applied to the motor portion 13 of the fuel pump 10 is V. Torque produced using the motor portion 13 is T. Rotation speed of the motor portion 13 is N. Discharge pressure of the fuel pump 10 is P. A discharge amount of the fuel pump 10 is Q. The efficiency ηfp of the fuel pump 10 is defined by ηfp=ηm× ηp=(P×Q)/(I×V). Therefore, as the motor efficiency ηm of the motor portion 13 is enhanced, the efficiency ηfp of the fuel pump 10 is enhanced.

The axial length of the motor portion 13 can be reduced, so that the fuel pump 10 can be downsized, in the case where torque required to the motor portion 13 is the same.

The bearing support 23 of the pump case 22 and the recession 99 of the armature 50 around the shaft 58 radially overlap one another in the vicinity of the pump case 22. The bearing support 23 of the pump case 22 axially thrusts into the armature 50. In this structure, the axial length of the fuel pump 10 can be further reduced, so that the fuel pump 10 can be further downsized.

(Second Embodiment)

Figure 4:
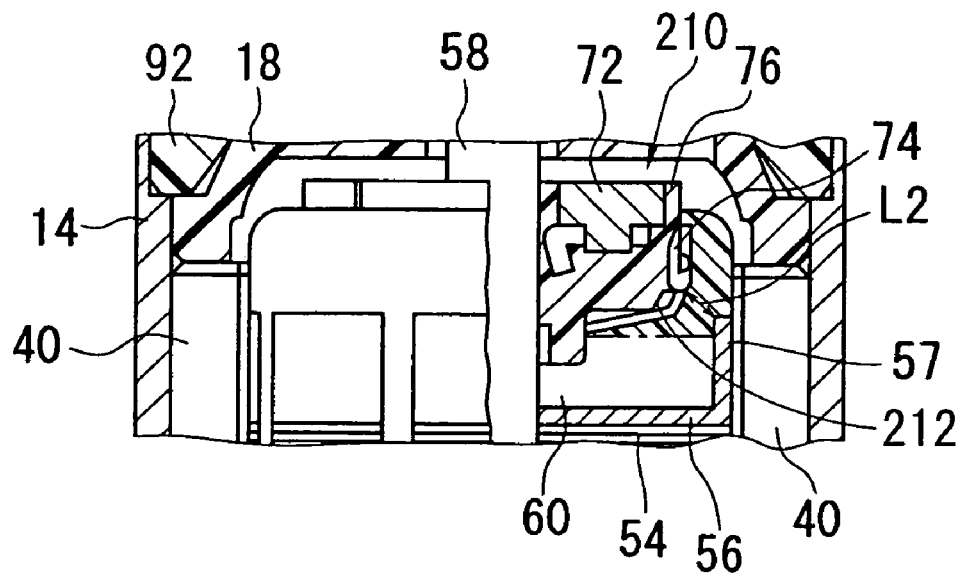
FIG. 4 is a sectional view showing an armature and a commutator defining therebetween a space, in which coils are formed by winding wires, in a fuel pump according to a second embodiment.

As shown in FIG. 4, in this embodiment, a commutator 210 in a substantially disc-shape has an outer circumferential periphery 212. The outer circumferential periphery 212 has a stepwise surface, which becomes close to the magnetic steel plate 56 on the side of the shaft 58 toward the center thereof. The outer circumferential periphery 212 is located on the radially inner side of the inner circumferential peripheries of the collar portions 57. The outer circumferential periphery 212 is distant from each of the collar portions 57 for a distance L2 that is greater than the diameter of the winding of each coil 60.

(Third Embodiment)

Figure 5:
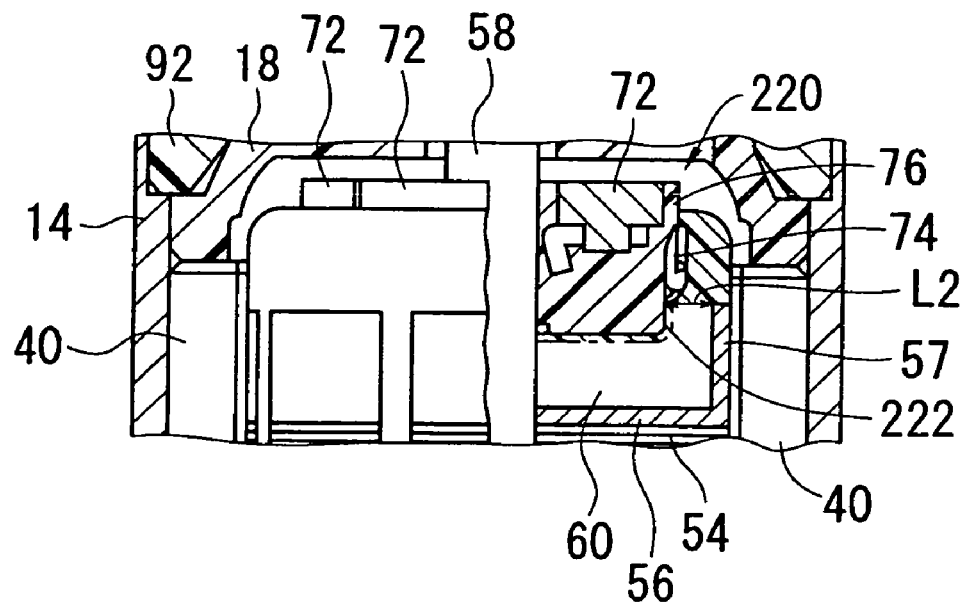
FIG. 5 is a sectional view showing an armature and a commutator defining therebetween a space, in which coils are formed by winding wires, in a fuel pump according to a third embodiment.

As shown in FIG. 5, in this embodiment, a commutator 220 in a substantially disc-shape has an outer circumferential periphery 222. The outer circumferential periphery 222 has neither a taper surface nor a stepwise surface. The outer circumferential periphery 222 is located along the axis of the shaft 58. The outer circumferential periphery 222 is located on the radially inner side of the inner circumferential peripheries of the collar portions 57. The outer circumferential periphery 222 is distant from each of the collar portions 57 for the distance L2 that is greater than the diameter of the winding of each coil 60.

In the above first to third embodiments, the collar portions 57 are provided to both of the magnetic steel plates 56 in both the axial ends of the rotor core 52. Alternatively, the collar portions may be provided to either one of the magnetic steel plates in either one axial end of the rotor core. The rotor core is not limited to being constructed by stacking magnetic plates. For example, a rotor core may be formed by sintering a magnetic material, and the outer circumferential periphery of at least one of the axial ends of the sintered rotor core may be provided with collar portions corresponding to the collar portions 57 in the above embodiments.

In the above first to third embodiments, the height of the coils 60 is less than the height of the collar portions 57 of the magnetic steel plate 56 in the vicinity of the commutator 70. Alternatively, the height of the coils 60 may be greater than the height of the collar portions 57 of the magnetic steel plate 56 in the vicinity of the commutator 70.

In the above embodiments, the bearing support 23 of the pump case 22 and the recession 99 of the armature 50 radially overlap one another. The bearing support 23 of the pump case 22 axially thrusts into the armature 50. Alternatively, the bearing support 23 of the pump case 22 may not axially thrust into the armature 50. The bearing support 23 and the armature 50 may not radially overlap one another.

(Fourth Embodiment)

Figure 6:
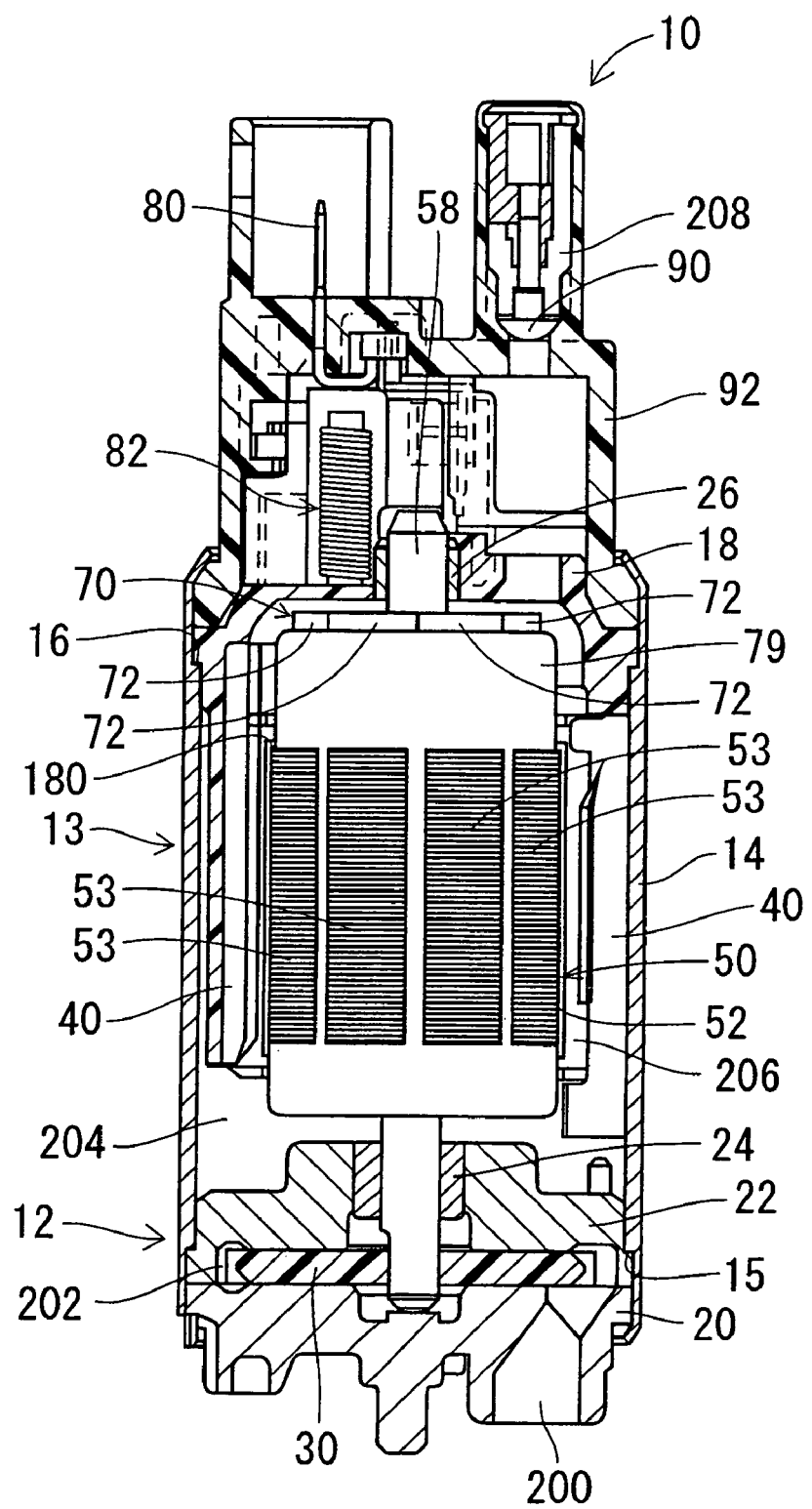
FIG. 6 is a sectional view showing a fuel pump according to a fourth embodiment.

As shown in FIG. 6, a fuel pump 10 is an in-tank type pump provided in an unillustrated fuel tank of a vehicle such as a two-wheel vehicle or a four-wheel vehicle. The fuel pump 10 draws fuel from the fuel tank, and supplies the fuel to an internal combustion engine.

The fuel pump 10 includes a pump portion 12 and a motor portion 13. The motor portion 13 drives the pump portion 12. A housing 14 accommodates both the pump portion 12 and the motor portion 13. The housing 14 has both axial ends respectively crimped and fixed to a pump case 20 and an end cover 92. The housing 14 is crimped to the pump case 20, such that a pump case 22 is interposed between the pump case 20 and a step 15 of the housing 14. The housing 14 is crimped to the end cover 92, such that a bearing holder 18 is interposed between the end cover 92 and a step 16 of the housing 14. The bearing holder 18 and the end cover 92 are formed of resin.

The pump portion 12 is a turbine pump that includes the pump cases 20, 22, and an impeller 30. The pump portion 12 is arranged in the vicinity of one axial end of the armature 50. The pump portion 12 is constructed of the impeller 30 serving as a rotor assembled to a shaft 58 of the armature 50. The pump cases 20, 22 serve as case members rotatably accommodating the impeller 30. The pump case 20 has an inlet port 200 through which fuel is drawn into pump passages 202. Each of the pump passages 202 is in a substantially C-shape extending along the outer circumferential periphery of the impeller 30. The impeller 30 in a substantially disc-shape has the outer circumferential periphery, to which multiple vane grooves are provided along a rotative direction. The armature 50 rotates, so that the impeller 30 rotates together with the shaft 58. Fuel flows out of a foreside vane groove, and flows into a backside vane groove with respect to the rotative direction with rotation of the impeller 30, so that the fuel forms a swirl flow through the pump passages 202. Fuel is pressurized through the pump passages 202 by repeating the flowing out of the foreside vane groove and flowing into the backside vane groove.

Fuel is drawn through the inlet port 200 with rotation of the impeller 30, and is pressurized through the pump passages 202 with rotation of the impeller 30, thereby being press-fed toward a motor chamber 204 of the motor portion 13 through an unillustrated outlet port provided to the pump case 22. The fuel press-fed toward the motor chamber 204 is supplied toward an engine through a discharge port 208, which is provided to the end cover 92, after passing through a fuel passage 206 defined between permanent magnets 40 and the armature 50. The discharge port 208 accommodates a check valve 90 for restricting counterflow of fuel trough the discharge port 208.

The motor portion 13 is constructed of the permanent magnets 40, the armature 50, a commutator 70, a choke coil 96, and the like. Each of the permanent magnets 40 is in a substantially arch shape. Multiple permanent magnets 40 are circumferentially arranged along the inner circumferential periphery of the housing 14. The permanent magnets 40 define multiple magnetic poles, which are circumferentially different from each other.

Figure 8:
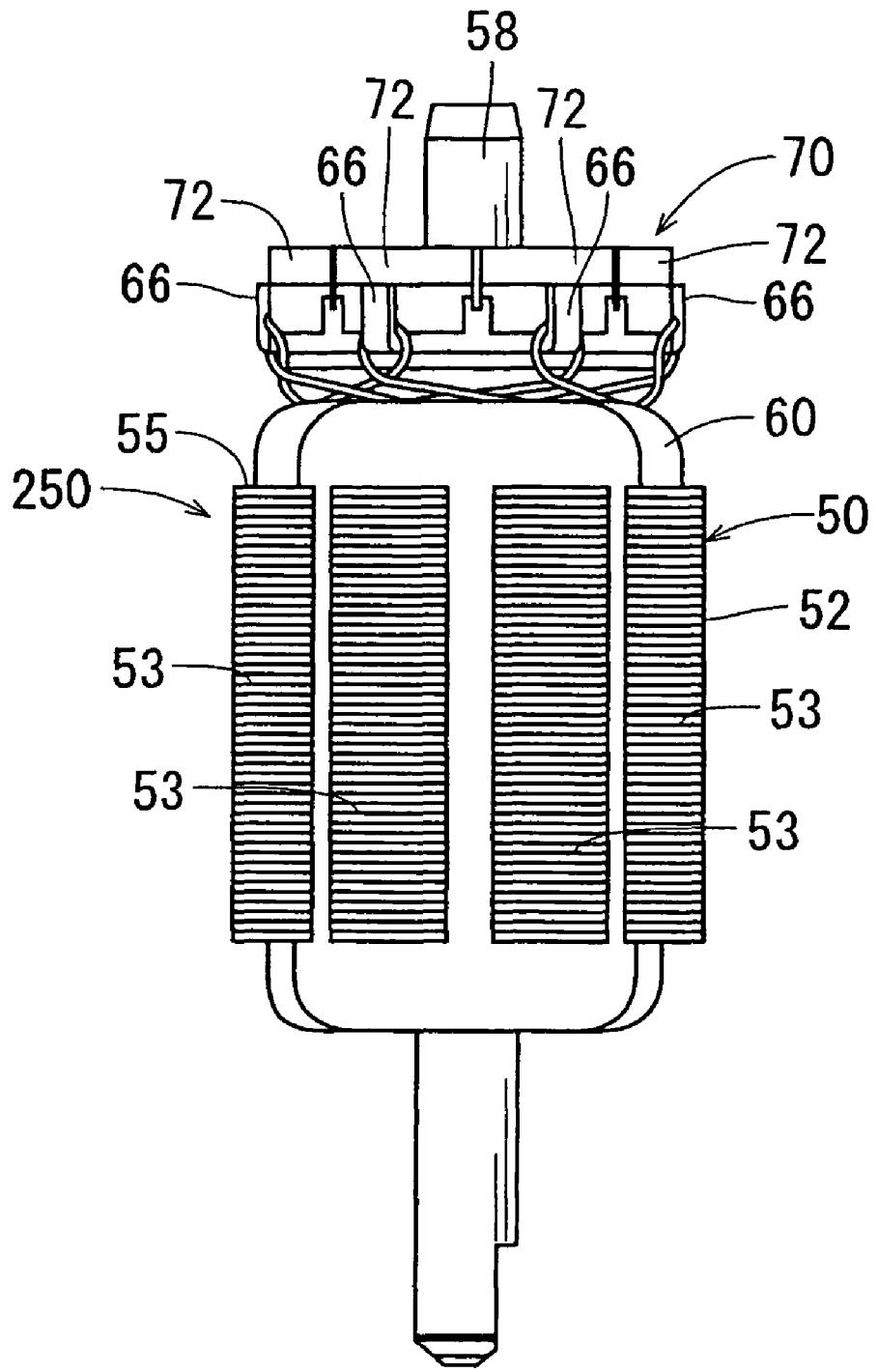
FIG. 8 is a side view showing the armature and the commutator before being charged with the resin material to mold the resin member in the fuel pump.

The armature 50 is rotatable on the radially inner side of the permanent magnets 40. The shaft 58 is press-inserted into a rotor core 52 to serve as a rotation axis of the armature 50. The shaft 58 has both axial ends each rotatably supported by corresponding one of the bearings 24, 26 formed of metal. The bearing 24 is supported by the pump case 22. The bearing 26 is supported by the bearing holder 18. As shown in FIG. 8, the armature 50 is constructed of the rotor core 52 and coils 60. The rotor core 52 is constructed by axially stacking magnetic steel plates. Each of the coils 60 is wound around the rotor core 52. The rotor core 52 has multiple magnetic pole cores 53 arranged with respect to the rotative direction. Each of the coils 60 is constructed by winding a winding around each of the magnetic pole cores 53. FIG. 8 depicts a structural assembly 250 in which the shaft 58 is press-inserted into the rotor core 52, and the armature 50 is assembled with the commutator 70, before injection molding the resin member 79 in the armature 50 and the commutator 70.

The armature 50, the rotation axis 58, the commutator (70), and the resin member 79 construct a motor device.

Figure 10A:
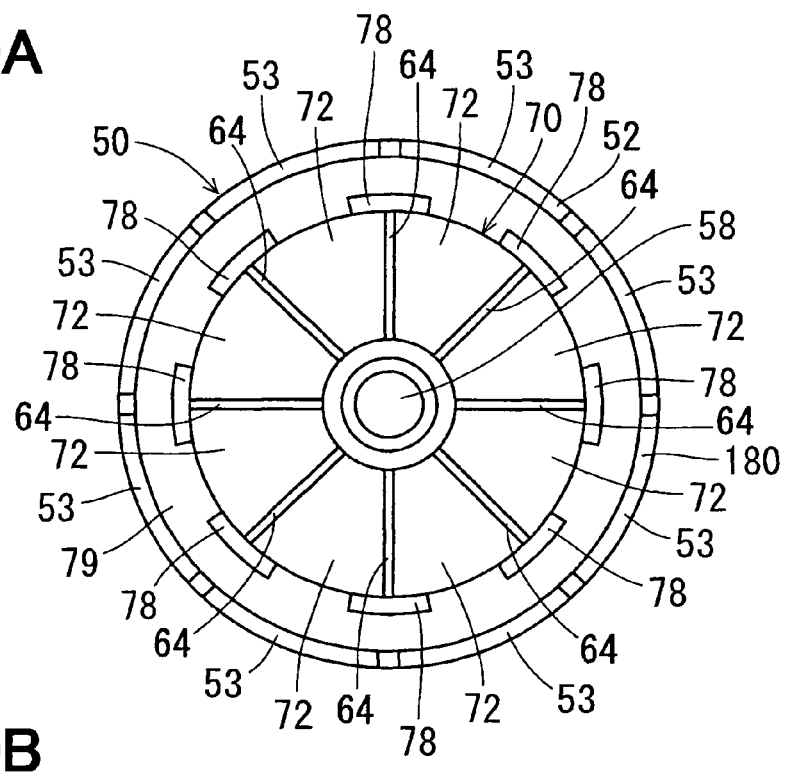
FIG. 10A is a view showing the armature and brushes of the commutator when being viewed from a contact surface therebetween.

The commutator 70 is in a substantially flat disc shape. The commutator 70 is provided to the axial end of the shaft 58 on the opposite side of the impeller 30 with respect to the armature 50. The commutator 70 includes multiple segments 72 that are arranged with respect to the rotative direction. The segments 72 are formed of carbon, for example. The segments 72, which are adjacent to each other with respect to the rotative direction, are electrically insulated from each other via a slit 64 defining a gap therebetween (FIG. 10A). Each of the segments 72 of the commutator 70 electrically connects with each of commutator terminals 66. The winding of each of the coil 60 is wound around each of the commutator terminals 66. The commutator terminals 66 are electrically connected respectively with the coils 60 on the outer circumferential periphery of the commutator 70 by fusing or the like. As the armature 50 rotates, the end surfaces of the segments 72 on the axially opposite side of the armature 50 sequentially slide on unillustrated brushes, so that the driving current supplied to the coils 60 is rectified.

As shown in FIG. 6, the end cover 92 is pres-inserted with pump terminals 80. The driving current is supplied from the pump terminals 80 to the coils 60 of the armature 50 via the unillustrated brushes and the commutator 70.

Figure 7:
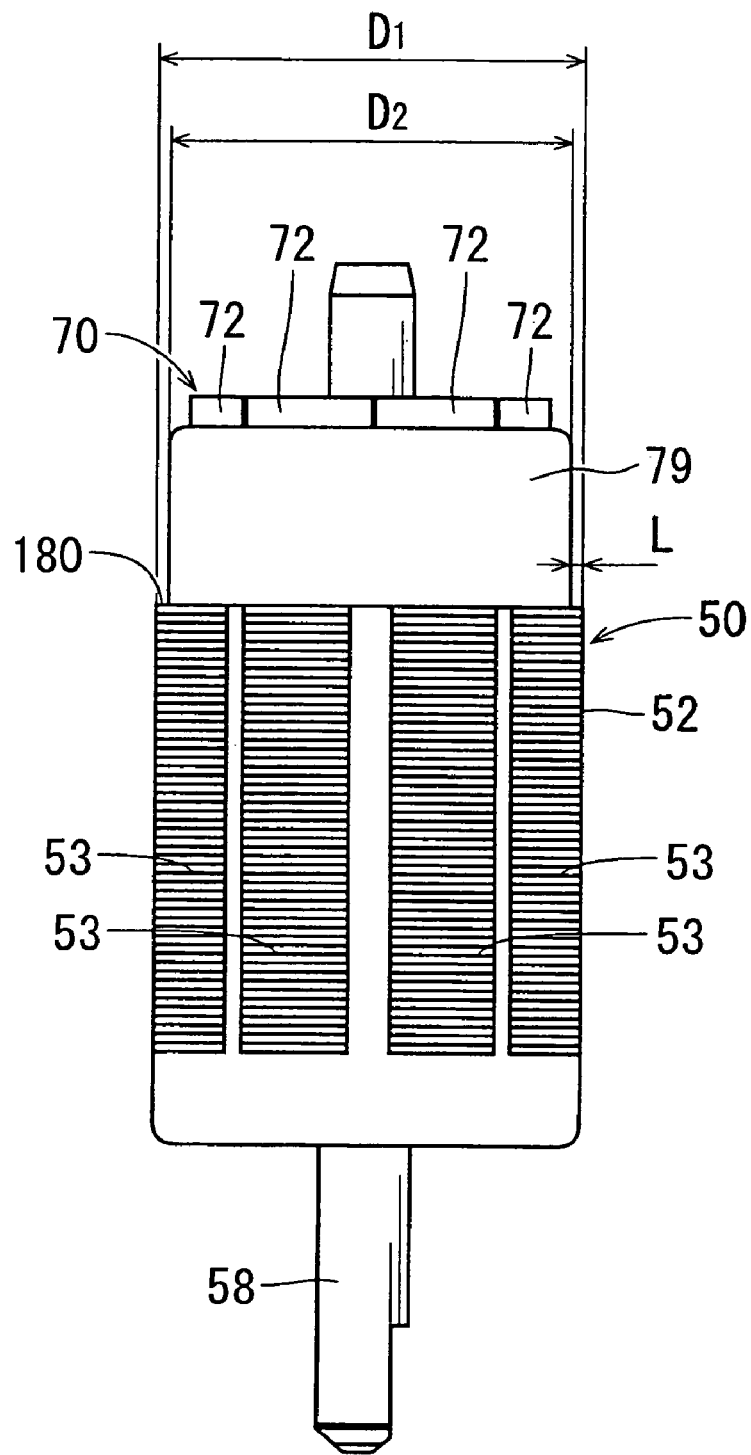
FIG. 7 is a side view showing an armature and a commutator after being charged with a resin material to mold a resin member in the fuel pump.

The resin member 79 is formed by charging electrically insulative resin in the armature 50 and the commutator 70 to surround fusing portions, which construct electrically connecting portions between the commutator terminals 66 and the windings of the coils 60, excluding the contact surface, which is adapted to be in contact with the brushes. The coil 60 and the electrically connecting portions are surrounded by the resin member 79, so that resistance against rotation of the motor portion 13 can be reduced. In addition, the coils 60 and the electrically connecting portions can be protected from corrosion. The rotor core 52 has an end portion 55 on the side of the commutator 70. When the electrically insulative resin is charged to form the resin member 79, the resin member 79 is radially recessed inwardly relative to the rotor core 52 in a boundary between the end portion 55 of the rotor core 52 (FIG. 8) and the resin member 79. Thus, the outer diameter of the resin member 79 of the rotor core 52 on the side of the commutator 70 is less than the outer diameter of the rotor core 52. As shown in FIG. 7, the outer diameter D1 of the rotor core 52 is greater than the outer diameter D2 of the resin member 79 on the side of the commutator 70 (D1>D2). In this structure, referring to FIGS. 6, 7, the end portion 55 of the rotor core 52 on the side of the commutator 70 and the resin member 79 therebetween have the circumferential boundary entirely defining a step 180. The width of the step 180 (FIG. 7) is set at substantially 0.5 mm.

As follows, a manufacturing method for the fuel pump 10 is described.

First, the shaft 58 is press-inserted into the rotor core 52. The commutator 70 is attached to the one axial end of the shaft 58. The wires are wound respectively around the magnetic pole cores 53 while the wire is wound around the commutator terminals 66 to construct the structural assembly 250 (FIG. 8). The commutator terminals 66 are electrically connected respectively with the wires of the coils 60 by fusing or the like.

Figure 9:
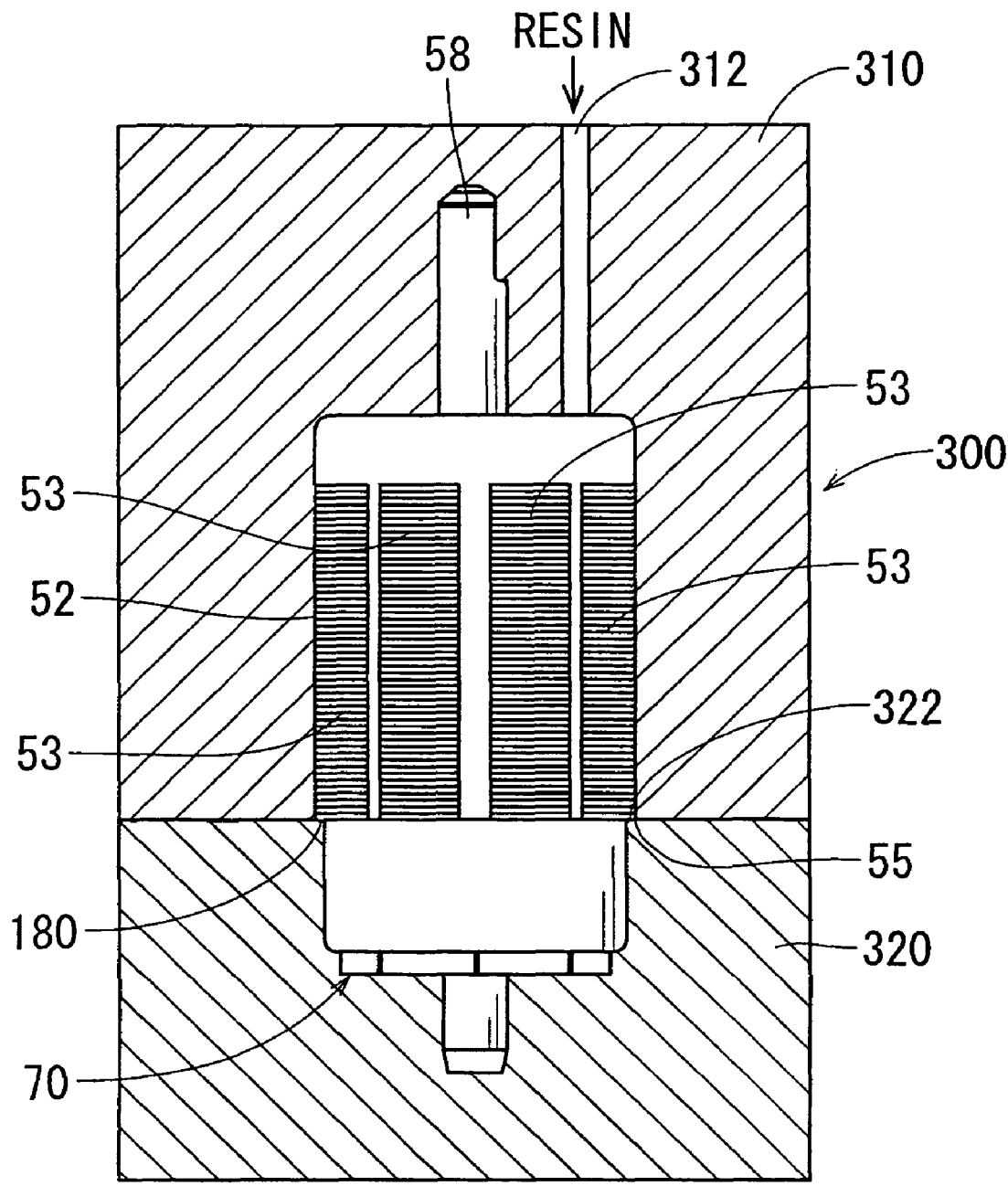
FIG. 9 is a schematic sectional view showing molding dies for molding the resin member.

Second, as shown in FIG. 9, the structural assembly 250 depicted in FIG. 8 is mounted to molding dies 300 constructed of an upper die 310 and a lower die 320. In this condition, the end portion 55 of the rotor core 52 on the side of the commutator 70 is in contact with a contact portion 322 of the lower die 320. FIG. 9 depicts the condition in which the resin member 79 is entirely injection molded in the molding dies 300.

Third, the electrically insulative resin is injected through a gate 312 into the molding dies 300 constructed of the upper die 310 and the lower die 320. The gate 312 is provided to the upper die 310 on the side of the other axial end of the rotor core 52. The resin injected through the gate 312 flows toward the commutator 70 after passing around the coil 60 and the gaps between the magnetic pole cores 53 adjacent to each other with respect to the rotative direction. In this condition, the rotor core 52 provided with the coils 60 is applied with force of injection molding pressure axially toward the lower side in FIG. 9. As the wires are tightly wound, the occupancy of the coils 60 increases. The force of injection molding pressure applied to the rotor core 52 axially toward the lower side in FIG. 9 is apt to become large with increase in occupancy of the coils 60. In this condition, the end portion 55 of the rotor core 52 on the side of the commutator 70 is in contact with the contact portion 322 of the lower die 320. Therefore, even when the rotor core 52 is applied with the force of injection molding pressure axially toward the lower side in FIG. 9, the rotor core 52 can be restricted from being axially displaced relative to the shaft 58.

Figure 10B:
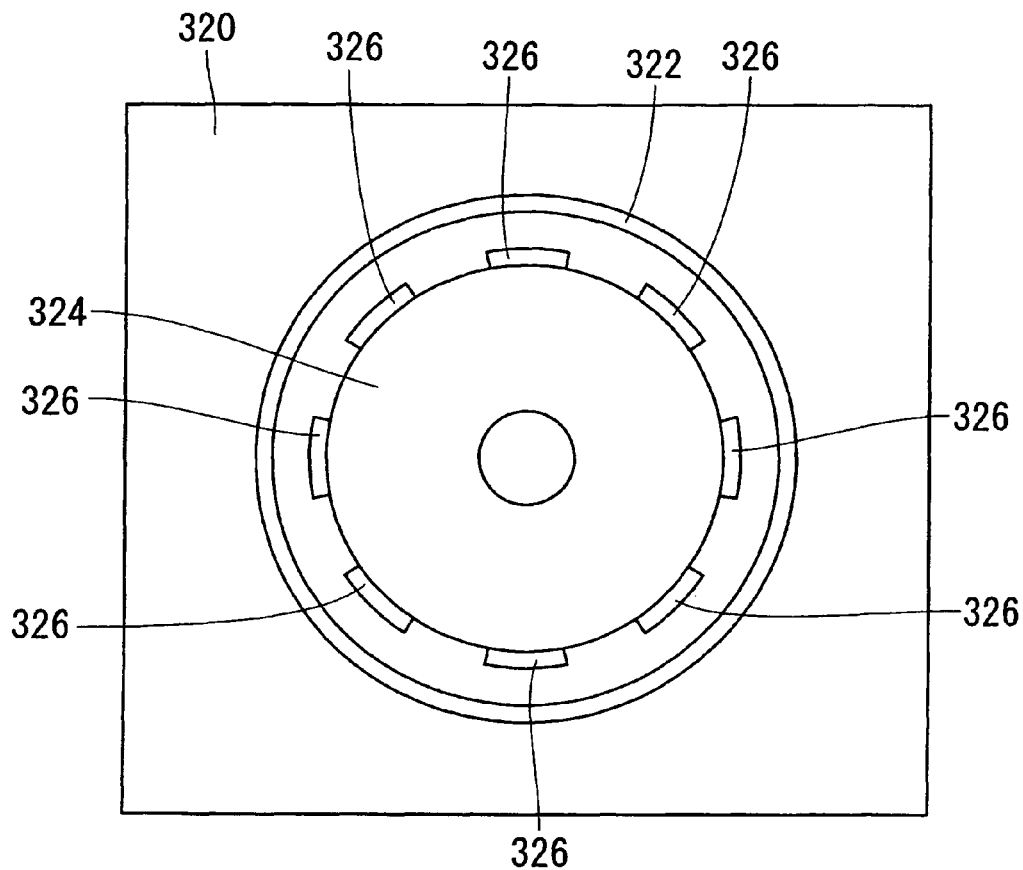
FIG. 10B is a view showing a lower die of the molding dies.

FIG. 10A depicts the armature 50 and the commutator 70 after injection molding of the resin member 79 when being viewed from the contact surface, via which the commutator 70 is adapted to be in contact with the brushes. FIG. 10B depicts the lower die 320. The lower die 320 has a molding cavity having the outer circumferential periphery defining the contact portion 322 with which the end portion 55 of the rotor core 52 makes contact. The step 180 of the injection molded resin member 79 is formed by defining the contact portion 322. The lower die 320 has a bottom portion 324 having protrusions 326 correspondingly to the slits 64 of the commutator 70. Each of the protrusions 326 makes contact with the outer circumferential periphery of the commutator 70. When the resin flows into the slits 64, the resin may be exposed from the contact surfaces, via which the segments 72 are adapted to be in contact with the brushes. In this structure, the protrusions 326 are provided to restrict the resin flowing through the upper die 310 into the lower die 320 from intruding into the slits 64. The upper die 310 and the lower die 320 are axially moved to opposite directions from each other, after injection molding the resin member 79. In this condition, the protrusions 326 respectively define marks 78 on the resin member 79 correspondingly on the radially outer side of the slits 64.

In this embodiment, the resin member 79 is injection molded in a condition where the end portion 55 of the rotor core 52 on the side of the commutator 70 is axially in contact with the contact portion 322 of the lower die 320. Therefore, even when the rotor core 52 is applied with the force of injection molding pressure axially toward the pump portion 12 on the side of the other axial end of the rotor core 52, the rotor core 52 can be restricted from being axially displaced relative to the shaft 58.

The outer diameter of the resin member 79, which is located on the side of the commutator 70 with respect to the rotor core 52, is less than the outer diameter of the rotor core 52. The circumferential boundary between the rotor core 52 and the resin member 79 entirely defines the step 180. In this structure, even when the resin member 79 swells due to exposure to fuel, the resin member 79, which is located on the side of the commutator 70 with respect to the rotor core 52, can be restricted from protruding radially outwardly beyond the rotor core 52. Therefore, even when the resin member 79 swells due to exposure to fuel, the resin member 79, on the side of the commutator 70 with respect to the rotor core 52, can be restricted from interfering with the permanent magnets 40 located on the radially outer side of the armature 50.

In particular, when fuel is alcohol or alcohol-like fuel, for example, the resin member is apt to swell. Therefore, the above structure is further effective when fuel is alcohol or alcohol-like fuel.

In this embodiment, the outer diameter of the resin member 79 throughout the axial lengthwise range thereof excluding the portion of the resin member 79, which is on the side of the commutator 70 with respect to the rotor core 52, is substantially the same as the outer diameter of the rotor core 52. In addition, the outer diameter of the resin member 79 on the side of the pump portion 12 with respect to the rotor core 52 is substantially the same as the outer diameter of the rotor core 52. The resin member 79 excluding the portion of the resin member 79, which is on the side of the commutator 70 with respect to the rotor core 52, contains resin less than the portion of the resin member 79 on the side of the commutator 70 with respect to the rotor core 52. Therefore, swelling of the resin member 79 excluding the portion of the resin member 79, which is on the side of the commutator 70 with respect to the rotor core 52 is less than the portion of the resin member 79 on the side of the commutator 70 with respect to the rotor core 52. Therefore, the resin member 79 excluding the portion of the resin member 79, which is on the side of the commutator 70 with respect to the rotor core 52, may not radially outwardly protrude beyond the outer circumferential periphery of the rotor core 52 to interfere with the permanent magnets 40, even when swelling.

Furthermore, in this embodiment, the molding dies 300 are constructed of the upper die 310 and the lower die 320, which are axially movable to opposite directions from each other for removing the molded product. Therefore, the molded product can be removed using the lower die 320 integrally provided with the protrusions 326. Thus, the number of the component of the molding dies 300 can be reduced.

In this embodiment, the molding dies 300 integrally have the protrusions 326 for prohibiting resin from flowing into the gap between the segments 72, which are adjacent to each other relative to the rotative direction, in the commutator 70. In this structure, the number of the molding dies 300 can be reduced compared with a structure in which an additional member is provided for prohibiting resin from flowing into the gap between the segments 72, which are adjacent each other in the commutator 70.

(Fifth Embodiment)

The structure of the fuel pump excluding the armature in this embodiment is substantially the same as that of the fourth embodiment.

Figure 11:
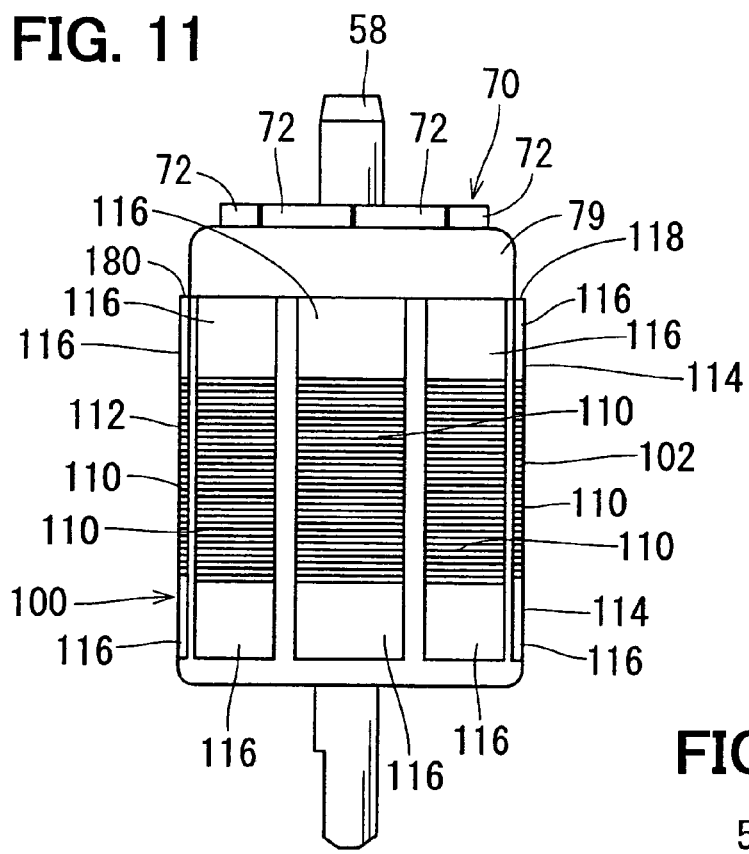
FIG. 11 is a side view showing an armature and a commutator being charged with a resin material to mold a resin member in a fuel pump according to a fifth embodiment.
Figure 12:
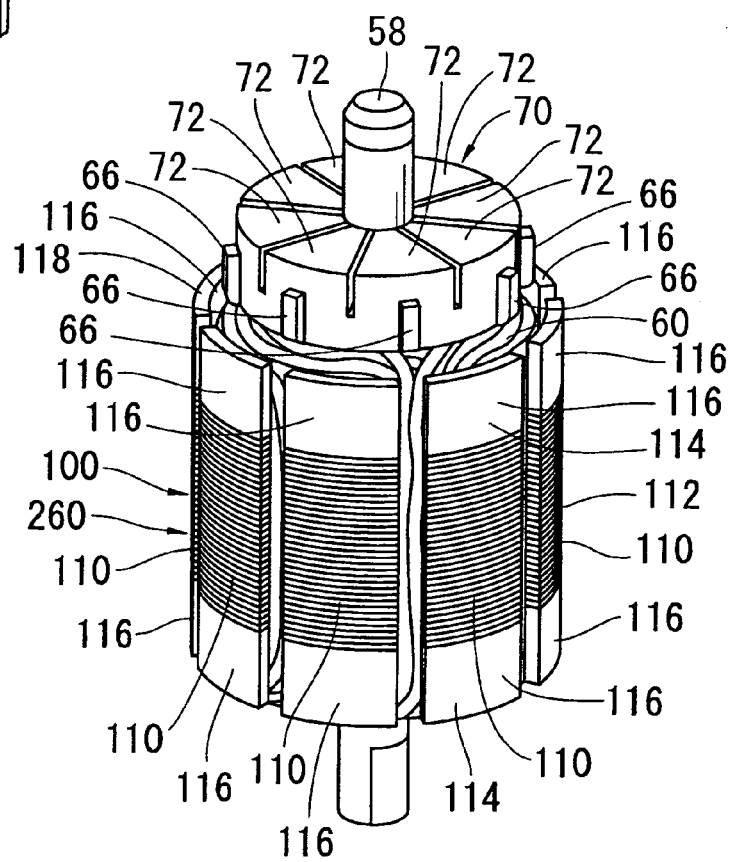
FIG. 12 is a perspective view showing the armature and the commutator being charged with the resin material in the fuel pump according to the fifth embodiment.
Figure 13A:
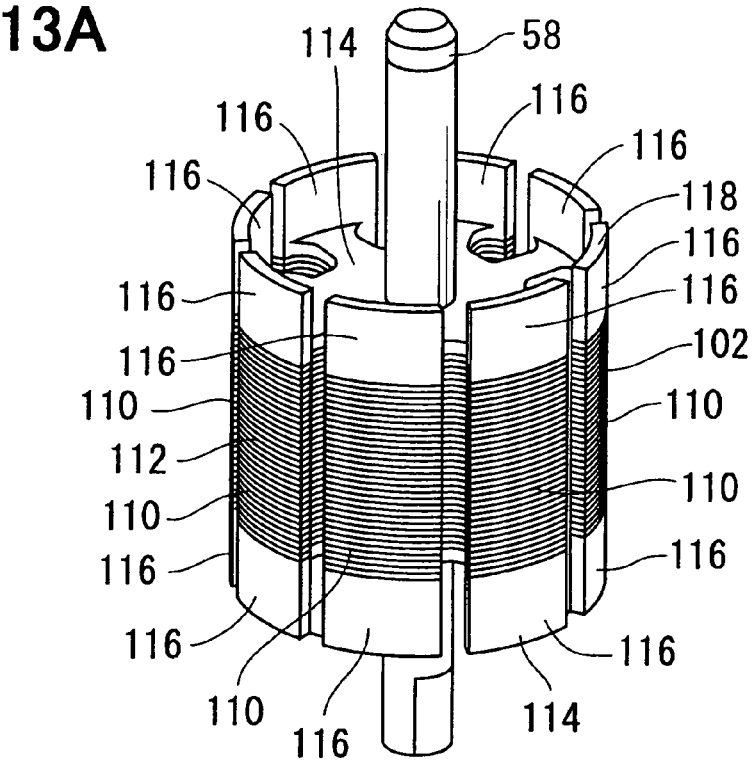
FIG. 13A is a perspective view showing a rotor core before being provided with coils.
Figure 13B:
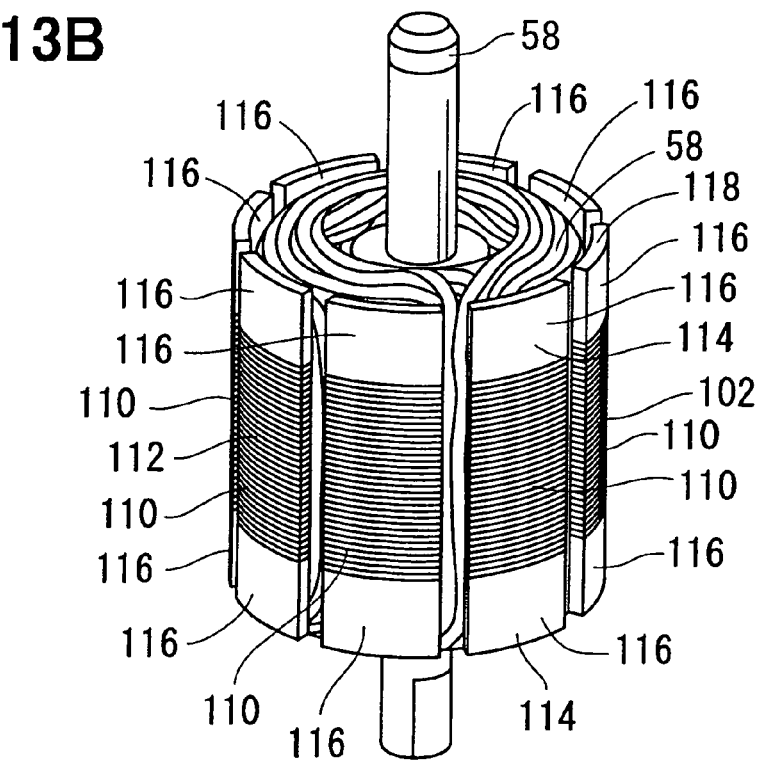
FIG. 13B is a perspective view showing the rotor core after being provided with the coils.

As shown in FIGS. 11 to 13, in this embodiment, each magnetic steel plate 114 is stacked on each axial end of a rotor core 102 of an armature 100. The thickness of each magnetic steel plate 114 is greater than the thickness of each of magnetic steel plates 112, other than the axial ends of the rotor core 102. The magnetic steel plates 112 and the magnetic steel plates 114 form multiple magnetic pole cores 110 with respect to the rotative direction. FIG. 12 depicts a structural assembly 260 in which the shaft 58 is press-inserted into the rotor core 102, and the armature 100 is assembled with the commutator 70, before injection molding a resin member 79. FIG. 13A depicts the rotor core 102, from which the commutator 70 is omitted, before being provided with the coils 60 and before being charged with the electrically insulative resin to mold the resin member 79. FIG. 13B depicts the rotor core 102, from which the commutator 70 is omitted, after being provided with the coils 60 and before being charged with the electrically insulative resin to mold the resin member 79. In reality, the coil 60 is constructed by winding wires around the rotor core 102 attached with the commutator 70. Each of the magnetic steel plates 114 has collar portions 116 correspondingly to the magnetic pole cores 110. One of the magnetic steel plates 114 has the outer circumferential peripheries each being axially bent by press-forming or the like toward the commutator 70, thereby being shaped to one of the collar portions 116. The other of the magnetic steel plates 114 has the outer circumferential peripheries each being axially bent by press-forming or the like toward the pump case 22, thereby being shaped to one of the collar portions 116. Each of the collar portions 116 has the outer circumferential peripheries defining the collar portions 116 axially extending toward corresponding one of the commutator 70 and the pump case 22.

The rotor core 102 has an end portion 118 (FIG. 12) on the side of the commutator 70. The end portion 118 and the resin member 79 axially therebetween define a boundary in which the resin member 79 is recessed radially inwardly with respect to the rotor core 102. In this structure, the end portion 118 of the rotor core 102 on the side of the commutator 70 and the resin member 79 therebetween have the circumferential boundary entirely defining the step 180. The step 180 is formed by injection molding the resin member 79 in a condition where the end portion 118 of the rotor core 102 on the side of the commutator 70 is axially in contact with the contact portion 322 of the lower die 320, similarly to the fourth embodiment. Therefore, even the rotor core 102 is applied with the force of injection molding pressure of the resin member 79, the rotor core 102 can be restricted from being axially displaced relative to the shaft 58, similarly to the fourth embodiment.

In this embodiment, the outer diameter of the resin member 79, on the side of the commutator 70 with respect to the rotor core 102, is also less than the outer diameter of the rotor core 102. In this structure, even when the resin member 79 swells due to exposure to fuel, the resin member 79, which is located on the side of the commutator 70 with respect to the rotor core 102, can be restricted from protruding radially outwardly beyond the rotor core 102. Therefore, even when the resin member 79 swells due to exposure to fuel, the resin member 79, on the side of the commutator 70 with respect to the rotor core 102, can be restricted from interfering with the permanent magnets 40 located on the radially outer side of the armature 100.

In this embodiment, one of the magnetic steel plates 114 has the outer circumferential peripheries each being bent by press-forming or the like toward the commutator 70, thereby being shaped to one of the collar portions 116. The other of the magnetic steel plates 114 has the outer circumferential peripheries each being bent by press-forming or the like toward the pump case 22, thereby being shaped to one of the collar portions 116. Accordingly, the end of the rotor core 102 is apt to receiving the molding pressure of the resin member 79. Therefore, when the structural assembly 260 shown in FIG. 12 is attached to the inside of the molding dies 300, and the resin material is injected for molding the resin member 79, the rotor core 102 provided with the coils 60 is applied with force of the injection molding pressure greater than that applied to the structural assembly 250 in the fourth embodiment. Even in this condition, the end portion 118 of the rotor core 102 on the side of the commutator 70 is in contact with the contact portion 322 of the lower die 320, so that the rotor core 102 can be restricted from being axially displaced relative to the shaft 58.

In this embodiment, the outer circumferential peripheries of the axial end of the rotor core 102 are respectively provided with the collar portions 116 each axially extending. In this structure, magnetic flux formed between the rotor core 102 and the permanent magnets 40 can be enhanced, compared with the rotor core not having the collar portions 116. Torque produced by the armature 100 can be enhanced compared with the armature not having the collar portions 116, in the case where the axial length of the armature 100 is the same. The axial length of the armature 100 can be reduced compared with the armature not having the collar portions 116, in the case where torque produced by the armature 100 is the same. Therefore, the fuel pump can be downsized.

(Sixth Embodiment)

The structure of the fuel pump excluding the armature in this embodiment is substantially the same as that of the fourth embodiment.

Figure 14:
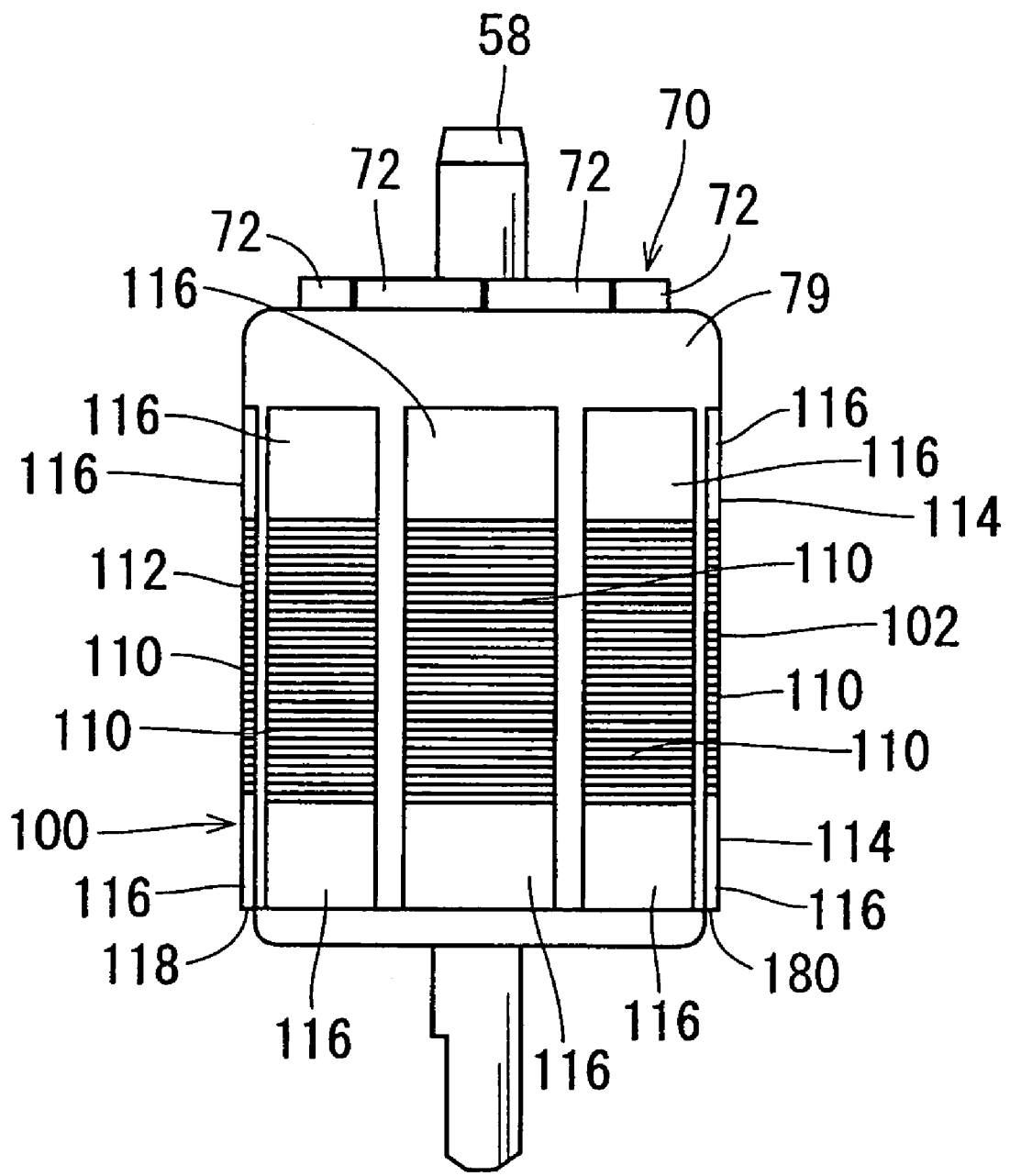
FIG. 14 is a side view showing an armature and a commutator being charged with a resin material to mold a resin member in a fuel pump according to a sixth embodiment.

As shown in FIG. 14, in this embodiment, the rotor core 102 has an end portion 118 on the side of the pump portion 12. The end portion 118 and the resin member 79 axially therebetween define a boundary in which the resin member 79 is recessed radially inwardly with respect to the rotor core 102. In this structure, the end portion 118 of the rotor core 102 on the side of the pump portion 12 and the resin member 79 therebetween have the circumferential boundary entirely defining the step 180. In this structure, the resin material is charged from the side of the commutator 70 to mold the resin member 79.

(Other Embodiment)

In the above fourth to sixth embodiments, the resin member 79 is radially recessed inwardly relative to the rotor core in the circumferential boundary between the axial end portion of the rotor core on the side of either the commutator or the pump portion and the resin member 79. The boundary between the rotor core and the resin member 79 define a step 180. Alternatively, the resin member 79 may be radially recessed inwardly relative to the rotor core in both the circumferential boundaries respectively between both the axial end portions of the rotor core and the resin member 79. Specifically, the resin member 79 may be radially recessed inwardly relative to the rotor core in the circumferential boundary between the axial end portion of the rotor core on the side of the commutator and the resin member 79. Furthermore, the resin member 79 may be radially recessed inwardly relative to the rotor core in the circumferential boundary between the axial end portion of the rotor core on the side of the pump portion and the resin member 79. In this structure, both the boundaries between the rotor core and the resin member 79 define the steps 180. Furthermore, the outer diameters of both end portions of the resin member respectively defining the steps relative to the rotor core therebetween are set to be less than the outer diameter of the rotor core. Therefore, even when the resin member swells due to exposure to fuel, the resin member can be restricted from interfering with the permanent magnets 40 located on the radially outer side of the armature.

In the above fourth to sixth embodiments, the step 180 formed in the circumferential boundary axially between the rotor core and the resin member 79 is left after molding the resin member 79, and thus, the fuel pump is constructed. Alternatively, the step 180, which is formed by molding the resin member 79 in a condition where the one axial end of the rotor core is in contact with the molding dies, may be removed by cutting the rotor core after molding the resin member 79, for example. Thus, the outer diameter of the rotor core may be the same as the outer diameter of the resin member 79.

In the above fourth to sixth embodiments, the resin material is injected to mold the resin member in a condition where the circumferential periphery of the one axial end of the rotor core is entirely in contact with the contact portion of the molding dies. Alternatively, the resin material may be injected to mold the resin member in a condition where the circumferential periphery of the one axial end of the rotor core is partially in contact with the contact portion of the molding dies. In this case, steps are partially formed in the circumferential boundary axially between the rotor core and the resin member, so that protrusions and recessions are circumferentially formed on the outer circumferential periphery of the resin member. These steps, which are partially formed in the circumferential boundary, and the protrusions and recessions, which are circumferentially formed on the outer circumferential periphery of the resin member, may be removed by cutting or the like, or may be left, and thus, the fuel pump may be constructed.

In the above fourth to sixth embodiments, the molding dies are movable to axially opposite directions from each other for removing the molded product. Alternatively, the molding dies may be movable to radially opposite directions from each other for removing the molded product.

In the above fourth to sixth embodiments, the outer circumferential peripheries of both the axial ends of the rotor core 102 are provided with the collar portions 116 each axially extending. Alternatively, one of the axial ends of the rotor core 102 may be provided with the collar portions 116.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A method for manufacturing a motor device for driving a pump portion of a fuel pump by being magnetized using a permanent magnet circumferentially surrounding the motor device, the method comprising:
    assembling a rotation axis to a rotor core, which is provided with a coil, to construct an armature;
    assembling the armature to a commutator to construct a structural assembly, the commutator being substantially in a flat disc shape and having an axial end surface configured to be in contact with a brush to rectify a driving current supplied to the coil;
    locating the structural assembly between an upper molding die and a lower molding die, the lower molding die having a molding cavity smaller in diameter than a molding cavity of the upper molding die, to thereby define a step having a contact surface, at the contact surface between the upper molding die and the lower molding die; and
    charging a resin material in a direction parallel to said rotation axis from a first axial end of the rotor core, which is at an opposite end of the rotor core from the commutator, into the molding dies to mold a resin member with the armature and the commutator in a condition where a second axial end of the rotor core, on an end side of the commutator, is in contact with the contact surface of the step.

2. The method according to claim 1, wherein the rotation axis is assembled to the rotor core by press-inserting the rotation axis into the rotor core.

3. The method according to claim 1, wherein said charging includes:
    charging the resin material in a condition where an axial end of the commutator, on an opposite side of the commutator from the rotor core, is in contact with one of the molding dies.

4. The method according to claim 1, wherein said charging includes:
    charging the resin material in a condition where the axial end surface of the commutator is in contact with one of the molding dies.

5. The method according to claim 1, wherein said step is defined at an upper, open axial end of the lower molding die.

6. The method according to claim 1, wherein a lower, open axial end of the upper molding die engages an upper, open axial end of the lower molding die radially outwardly of and adjacent the step.

7. The method according to claim 1, wherein the upper molding die rests on the lower molding die such that the difference in diameter between the molding cavity of the upper molding die and the lower molding die creates the contact surface of the step within the same plane as the interface between the upper and lower molding dies.

8. A method for manufacturing a motor device for driving a pump portion of a fuel pump by being magnetized using a permanent magnet circumferentially surrounding the motor device, the method comprising:
    assembling a rotation axis to a rotor core, which is provided with a coil, to construct an armature;
    assembling the armature to a commutator to construct a structural assembly, the commutator being substantially in a flat disc shape and having an axial end surface configured to be in contact with a brush to rectify a driving current supplied to the coil;
    locating the structural assembly between an upper molding die and a lower molding die, the lower molding die having a molding cavity smaller in diameter than a molding cavity of the upper molding die, to thereby define a step having a contact surface, at the contact surface between the upper molding die and the lower molding die; and
    charging a resin material in a direction parallel to said rotation axis from a first axial end of the rotor core, which is at an opposite end of the rotor core from the commutator, into the molding dies to mold a resin member with the armature and the commutator in a condition where a second axial end of the rotor core, on an end side of the commutator, is in contact with the contact surface of the step, wherein:
    the upper molding die is located adjacent the first axial end of the rotor core and the resin material is charged through a gate in the upper molding die;
    the lower molding die is disposed adjacent the second axial end of the rotor core, on an end side of the commutator; and
    the step is located closer to the second axial end of the rotor core than the first axial end of the rotor core in said direction parallel to the rotation axis.

9. The method according to claim 8, wherein the upper molding die rests on the lower molding die such that the difference in diameter between the molding cavity of the upper molding die and the lower molding die creates the contact surface of the step within the same plane as the interface between the upper and lower molding dies.

* * * * *